United States Patent

Bea

[11] Patent Number: 6,113,156
[45] Date of Patent: Sep. 5, 2000

[54] PIPE CONNECTOR

[75] Inventor: Thomas T. Bea, Pasadena, Calif.

[73] Assignee: Flex Connection, Inc., Pasadena, Calif.

[21] Appl. No.: 09/062,196

[22] Filed: Apr. 17, 1998

[51] Int. Cl.[7] .................................................. F16L 41/00
[52] U.S. Cl. ........................ 285/140.1; 285/222; 285/214
[58] Field of Search ................................. 285/140.1, 214, 285/FOR 144, 213, 346, 222

[56] References Cited

U.S. PATENT DOCUMENTS

| 906,870 | 12/1908 | Grabel. | |
|---|---|---|---|
| 3,406,988 | 10/1968 | Jones. | |
| 3,490,791 | 1/1970 | Mitchell. | |
| 3,548,079 | 12/1970 | Jones et al.. | |
| 3,663,042 | 5/1972 | Fowler. | |
| 3,677,578 | 7/1972 | Roos. | |
| 3,879,069 | 4/1975 | Oostenbrink. | |
| 3,953,555 | 4/1976 | Gley. | |
| 3,958,313 | 5/1976 | Rossborough. | |
| 4,009,545 | 3/1977 | Rossborough. | |
| 4,019,760 | 4/1977 | Streit. | |
| 4,155,572 | 5/1979 | Bretone, Jr.. | |
| 4,365,829 | 12/1982 | Fowler | 285/140.1 |
| 4,441,744 | 4/1984 | Oostenbrink et al. | 285/140.1 |
| 5,145,216 | 9/1992 | Valls, Jr. | 285/140.1 |
| 5,181,746 | 1/1993 | Hessel et al. | 285/140.1 |
| 5,205,593 | 4/1993 | Fondeur | 285/214 |
| 5,261,761 | 11/1993 | Knappert et al.. | |
| 5,431,459 | 7/1995 | Gundy. | |

Primary Examiner—Eric K. Nicholson
Attorney, Agent, or Firm—Pillsbury Madison & Sutro LLP

[57] ABSTRACT

An apparatus for connecting a first tubular conduit to be in flow communication with a second tubular conduit includes an adapter and a generally cylindrical wedge. The adapter defines an upper, generally cylindrical surface and a lower, generally cylindrical surface with an inner ledge therebetween. The adapter is configured for connection to: (i) the first tubular conduit such that a portion of the adapter is substantially flush with an inner surface of the first tubular conduit, and (ii) the second tubular conduit such that there is flow communication therebetween. The wedge has an outwardly extending flange portion and a generally cylindrical depending portion. The wedge is configured for insertion into the adapter such that the flange portion abuts against the ledge of the adapter and the cylindrical portion is substantially flush with the inner surface of the first tubular conduit. A portion of the wedge is urged against the lower cylindrical surface of the adapter such that a portion of the lower cylindrical surface of the adapter expands radially outward to form a seal with the first tubular conduit.

6 Claims, 5 Drawing Sheets

PIPE CONNECTOR

FIELD OF THE INVENTION

This invention relates to pipe connectors, and, in particular embodiments, to a sewer connector for connecting a lateral pipe to a main sewer line.

BACKGROUND OF THE INVENTION

Traditionally, sewer connectors have used cement or epoxy resin for sealing a lateral pipe to a main sewer line. However, installation of these connectors requires a great deal of time and effort, particularly because a person installing the connector must wait for the cement or resin to set and dry. In addition, the connectors are rigid and tend to crack during the settling or shifting of earth surrounding the lateral pipe.

To overcome these drawbacks, sewer connectors have been developed that do not use cement or resin for sealing a lateral pipe to a main sewer line. These connectors include an elastic cylinder or sleeve that is inserted into a hole in the main sewer line, a rigid pipe or wedge that is inserted into the cylinder to force the entire cylinder to expand and thus form a seal with the main sewer line, and the lateral pipe that is inserted into the cylinder. The connectors deform rather than crack during the settling or shifting of earth surrounding the lateral pipe. However, in these connectors, the pipe is inserted into the cylinder such that the entire cylinder is forced to expand in order to form a seal with the main sewer line. Both the lateral pipe and the connector are vulnerable to shear forces resulting from the settling or shifting of earth surrounding the lateral pipe. Consequently, the lateral pipe is subject to displacement, and the connector can be easily deformed beyond its limits, thus resulting in damage, failure, and/or leakage of the connector. In addition, the connectors protrude into the main sewer line, and thus, make it difficult to clean the main sewer line. Furthermore, the connectors do not provide any indication of the correct alignment between the cylinder and the pipe. Therefore, it is difficult to align the cylinder with the pipe during installation of the connectors. It is also not possible to check the alignment of the connectors from remote locations inside the main sewer line.

SUMMARY OF THE DISCLOSURE

It is an object of an embodiment of the present invention to provide an improved connector, which obviates for practical purposes, the above mentioned limitations.

According to an embodiment of the present invention, an apparatus for connecting a first tubular conduit to be in flow communication with a second tubular conduit includes an adapter and a generally cylindrical wedge. The adapter defines an upper, generally cylindrical surface and a lower, generally cylindrical surface with an inner ledge therebetween. The adapter is configured for connection to: (i) the first tubular conduit such that a portion of the adapter is substantially flush with an inner surface of the first tubular conduit, and (ii) the second tubular conduit such that there is flow communication therebetween. The wedge has an outwardly extending flange portion and a generally cylindrical depending portion. The wedge is configured for insertion into the adapter such that the flange portion abuts against the ledge of the adapter and the cylindrical portion is substantially flush with the inner surface of the first tubular conduit. A portion of the wedge is urged against the lower cylindrical surface of the adapter such that a portion of the lower cylindrical surface of the adapter expands radially outward to form a seal with the first tubular conduit.

In particular embodiments of the present invention, the adapter further includes a plurality of stops that adjust the position of the adapter to be relative to the first tubular conduit. In other embodiments of the present invention, the apparatus further includes alignment means for aligning the adapter and the wedge when joined together. In yet other alternative embodiments of the present invention, the adapter further includes a band for securing the second tubular conduit thereto.

In another embodiment of the present invention, an apparatus for connecting a first tubular conduit in flow communication with a second tubular conduit includes an adapter and a generally cylindrical wedge. The adapter defines an upper, generally cylindrical surface and a lower, generally cylindrical surface with an inner ledge therebetween, and the diameter of the upper cylindrical surface is wider than the diameter of the lower cylindrical surface. The adapter is connected to the first and second tubular conduits such that there is flow connection therebetween. The wedge has an outwardly extending flange portion and a generally cylindrical depending portion. The wedge is configured for insertion into the adapter such that the flange portion abuts against the ledge of the adapter. A portion of the wedge is urged against the lower cylindrical surface of the adapter such that a portion of the lower cylindrical surface of the adapter expands radially outward.

In particular embodiments of the present invention, the apparatus further includes a band for maintaining placement of the second tubular conduit therein.

In yet another embodiment of the present invention, in an apparatus connecting a first tubular conduit in flow communication with a second tubular conduit, in which an adapter is connected to the first and second tubular conduits such that there is flow communication therebetween, and in which a wedge is inserted into the adapter, the improvement in the apparatus includes the adapter and the wedge. The adapter defines an upper, generally cylindrical surface and a lower, generally cylindrical surface with an inner ledge therebetween, and the diameter of the upper cylindrical surface is wider than the diameter of the lower cylindrical surface. The adapter is configured for connection to the first tubular conduit such that a portion of the adapter is substantially flush with an inner surface of the first tubular conduit. The generally cylindrical wedge has an outwardly extending flange portion and a generally cylindrical depending portion. The wedge is configured for insertion into the adapter such that the flange portion abuts against the ledge of the adapter and the cylindrical portion is substantially flush with the inner surface of the first tubular conduit. Also, the second tubular conduit abuts against the flange portion of the wedge. A portion of the wedge is urged against the lower cylindrical surface of the adapter such that a portion of the lower cylindrical surface of the adapter expands radially outward to form a seal with the first tubular conduit.

Other features and advantages of the invention will become apparent from the following detailed description, taken in conjunction with the accompanying drawings that illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
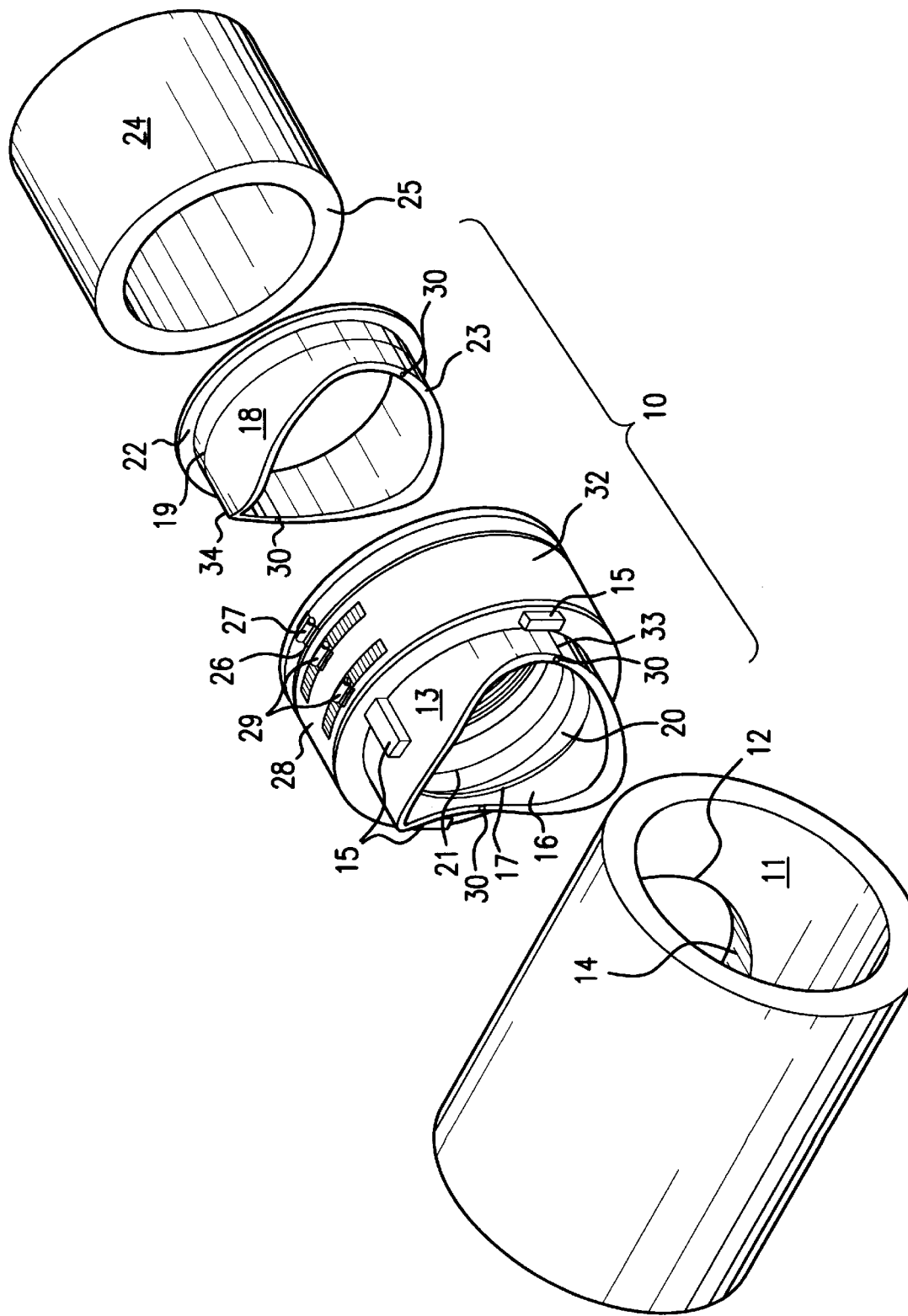
FIG. 1 is a perspective view of a main line, a connector, and a lateral pipe, prior to installation of the connector, in accordance with an embodiment of the present invention.

As shown in the drawings for purposes of illustration, the invention is embodied in a pipe connector for connecting a first pipe or tubular conduit to be in flow communication with a second pipe or tubular conduit. In preferred embodiments of the present invention, the connector is used to connect a lateral pipe to a main sewer line. However, it will be recognized that other embodiments of the present invention may be used to connect a lateral pipe to other drainage lines and may be used to connect other types of pipes or tubular conduits. In alternative embodiments, the connector may be used to connect a lateral pipe to other lines, such as water lines, oil pipelines, or the like. In further alternative embodiments, the connector may be used to connect other configurations of pipes, such as two lateral pipes or the like.

FIG. 1 shows a perspective view of a first tubular conduit or main line 11, a connector 10, and a second tubular conduit or lateral pipe 24, prior to installation of the connector 10, in accordance with an embodiment of the present invention. In preferred embodiments, the main line 11 is a generally cylindrical pipe or tubular conduit that has generally smooth, curved, inner and outer surfaces. The lateral pipe 24 is also a generally cylindrical pipe or tubular conduit that has generally smooth, curved, inner and outer surfaces. The diameter of the first tubular conduit or main line 11 is either the same as or wider than the diameter of the second tubular conduit or lateral pipe 24. In alternative embodiments, the diameter of the first tubular conduit 11 may be narrower than the diameter of the second tubular conduit 24. In one preferred embodiment, a person installing the connector 10 drills a hole 12 into a side wall of the main line 11. However, in alternative embodiments, the hole 12 may be formed using processes other than drilling, such as cutting or the like. As seen in FIG. 1, hole 12 defines a wall or edge 14.

A connector 10 includes an adapter 13 and a wedge 18. In preferred embodiments, the adapter 13 is made of an elastic material, such as rubber, although other materials such as flexible and plastics are within the scope of this invention. An elastic material such as rubber is preferred because a portion of the adapter 13 expands radially outward, as discussed below. In yet other alternative embodiments, the adapter 13 may be made of other materials, such as ceramics, composites, and the like.

Figure 2:
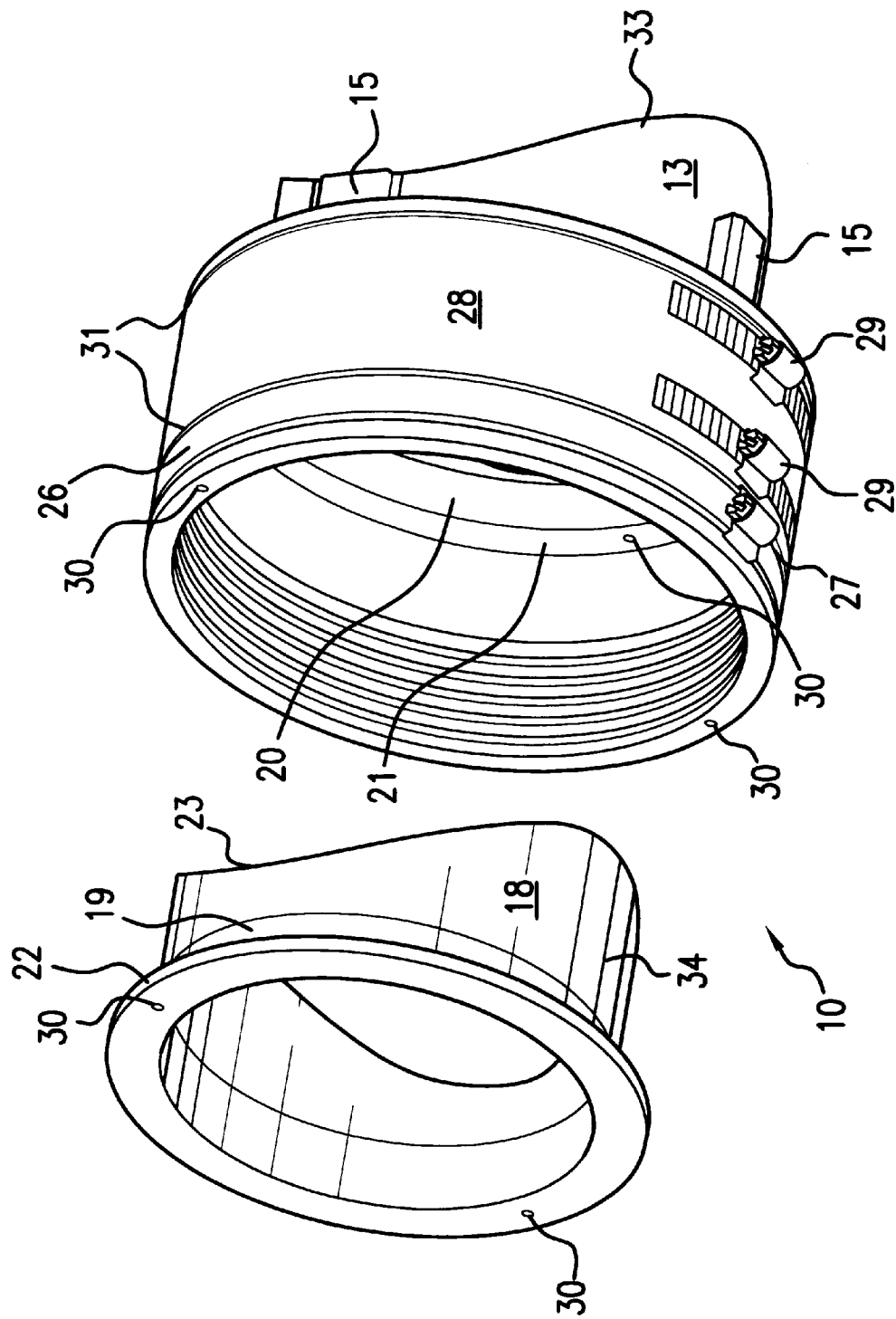
FIG. 2 is an exploded perspective view of an adapter and a wedge of the connector, prior to installation of the connector, in accordance with an embodiment of the present invention.
Figure 3:
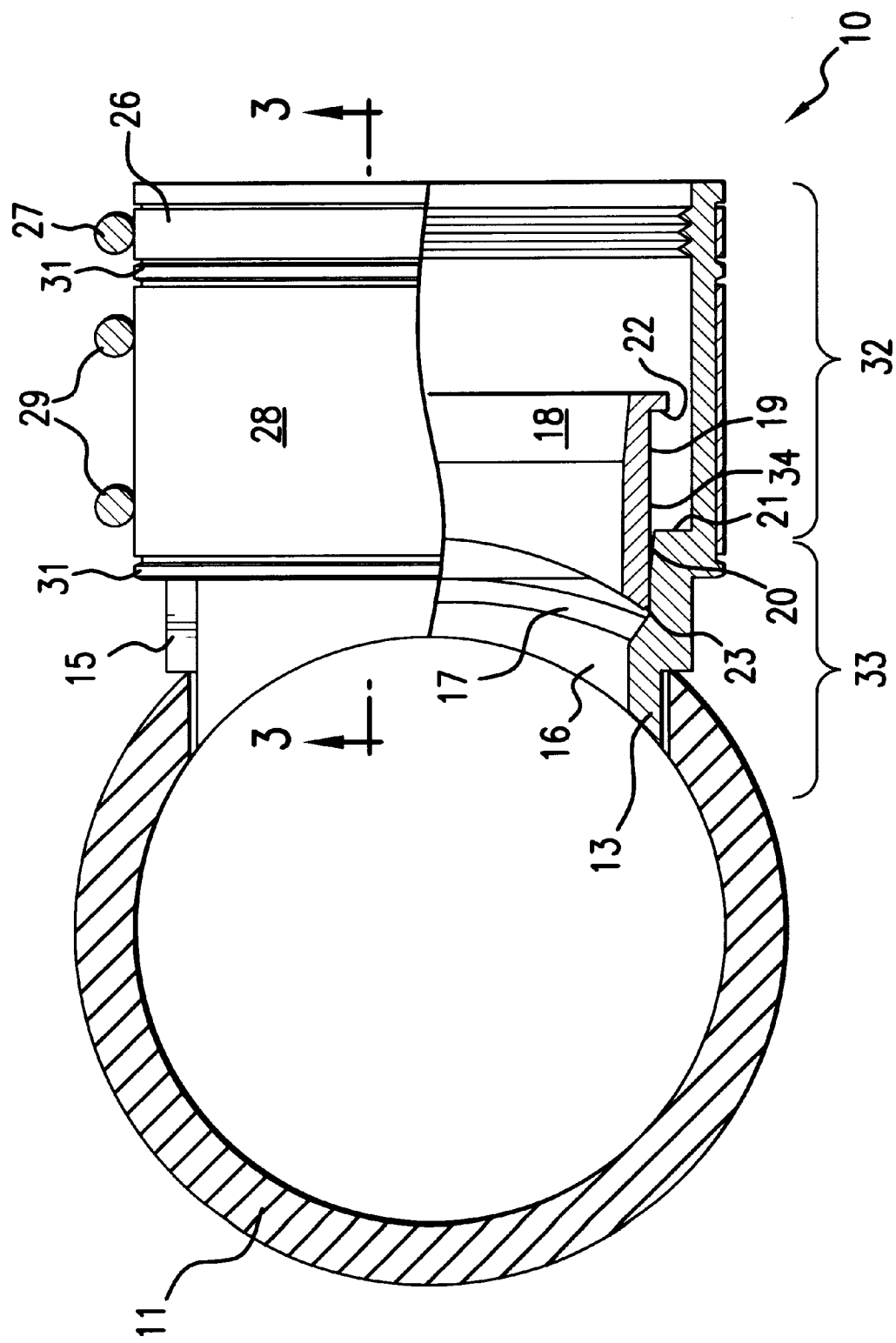
FIG. 3 is a partial cross-sectional view of the adapter fully inserted in the main line and the wedge partially inserted in the adapter, along the line 3—3 shown in FIG. 3, in accordance with an embodiment of the present invention.

Referring to FIGS. 1–3, the adapter 13 is formed from a first, upper, generally cylindrical surface portion 32 and a second, lower, generally cylindrical surface portion 33 with a round, circumferential inner ledge 21 defined therebetween. In one embodiment, the diameter of the upper cylindrical surface 32 is wider than the diameter of the lower cylindrical surface 33. The ledge 21 extends circumferentially and inwardly along the inner surface of the adapter 13. The lower cylindrical surface 33 is defined by a cylindrical band portion 20, a circular shoulder portion 17, and a circular expansion band portion 16. The cylindrical band 20 is adjacent to the shoulder 17, and the shoulder 17 tapers inward to the expansion band 16. The diameter of the cylindrical band 20 is wider than the diameter of the shoulder 17 and the diameter of the expansion band 16. In alternative embodiments, the diameter of the cylindrical band 20 may be the same as or narrower than the diameter of the shoulder 17 and the diameter of the expansion band 16.

In preferred embodiments, the wedge 18 is made of a generally rigid material, such as plastic, and is formed using an injection molding process. A rigid material such as plastic is preferred because the wedge 18 is inserted into the adapter 13 and pushes against a portion of the adapter 13 such that the portion of the adapter 13 expands radially outward, as discussed below. However, in alternative embodiments, the wedge 18 may be made of other materials, such as ceramic, metal, composites, or the like, and may be formed using other processes, such as cutting or the like.

Referring to FIGS. 1–3, the wedge 18 is generally cylindrical. The wedge 18 has an outwardly extending flange portion 22 and a generally cylindrical depending portion. The wedge 18 also has a beveled surface 23 at the end of the cylindrical depending portion opposite the flange 22. The cylindrical depending portion of the wedge 18 is formed from a first, generally cylindrical surface portion 19 that tapers inward and a second, generally cylindrical surface portion 34 that widens outward. The diameter of the first cylindrical surface 19 is slightly narrower than the diameter of the second cylindrical surface 34. The diameter of the first cylindrical surface 19 is also slightly narrower than the diameter of the cylindrical band 20 of the adapter 13. Additionally, the diameter of the second cylindrical surface 34 is slightly wider than the diameter of the shoulder 17 and the diameter of the expansion band 16 of the adapter 13. In alternative embodiments, the diameter of the first cylindrical surface 19 may be the same as or wider than diameter of the second cylindrical surface 34 and the diameter of the cylindrical band 20 of the adapter 13. In further alternative embodiments, the diameter of the second cylindrical surface 34 may be the same as or narrower than the diameter of the shoulder 17 and the diameter of the expansion band 16.

Referring to FIGS. 1–5, one end of the adapter 13 is inserted into the hole 12 in the main line 11. In preferred embodiments, the adapter 13 has a plurality of molded stops or posts 15 along the outer surface of the adapter 13 that adjust the position of the adapter 13 such that the adapter 13 is substantially flush with the inner surface of the main line 11. As shown, the lower cylindrical surface portion 33 of the adapter 13 is configured such that when the adapter 13 is inserted in main line 11, the lower cylindrical surface 33 matingly engages edge 14 of the hole 12, but preferably does not extend into main line 11. The posts 15 rest against the outer surface of the main line 11 to limit entry of the adapter 13 into the main line 11 and to position the adapter 13, and more particularly the lower cylindrical surface portion 33 of the adapter 13, such that the adapter 13 is substantially flush with the inner surface of the main line 11. The posts 15 can be trimmed to adapt the adapter 13 to various diameters of the main line 11. In alternative embodiments, the stops 15 may have other shapes and forms, such as a series of corrugated grooves, a pair of protuberances, or the like. In further alternative embodiments, the stops 15 may be formed using processes other than molding, such as cutting or the like.

Referring to FIG. 3, when the adapter 13 is inserted into the hole 12 in the main line 11, the expansion band portion 16 of the adapter 13 abuts into mating engagement with edge 14 of the hole 12. The wedge 18 is inserted into the adapter 13, and the beveled surface 23 of the wedge 18 facilitates insertion of the wedge 18 into the adapter 13. In preferred embodiments, a plurality of alignment marks 30 are disposed on both ends of the adapter 13, the ledge 21 along the inner surface of the adapter 13, and both ends of the wedge 18. In the embodiment illustrated in FIGS. 1 and 2, the marks 30 are pairs of molded dimples 30 disposed about 180 degrees apart. FIG. 2 illustrates the positions of the dimples 30 on the ends and the ledge 21 of the adapter 13 and the ends of the wedge 18 as seen by the person installing the connector 10 as the wedge 18 is inserted into the adapter 13. After installation, the positions of the dimples 30 on the ends of the adapter 13 and the ends of the wedge 18 can be checked by remotely controlled video cameras from inside the main line 11. The dimples 30 thus aid in aligning and checking the alignment of the adapter 13 with the wedge 18. In alternative embodiments, the marks 30 may have other shapes and forms, such as lines, dots, or the like, and may be formed using processes other than molding, such as drawing, etching, or the like. Yet other alignment means, such as pins and grooves or the like, can also be used. In further alternative embodiments, the marks 30 may be disposed in other patterns, such as a pair of marks disposed about 90 degrees apart or the like.

Figure 4:
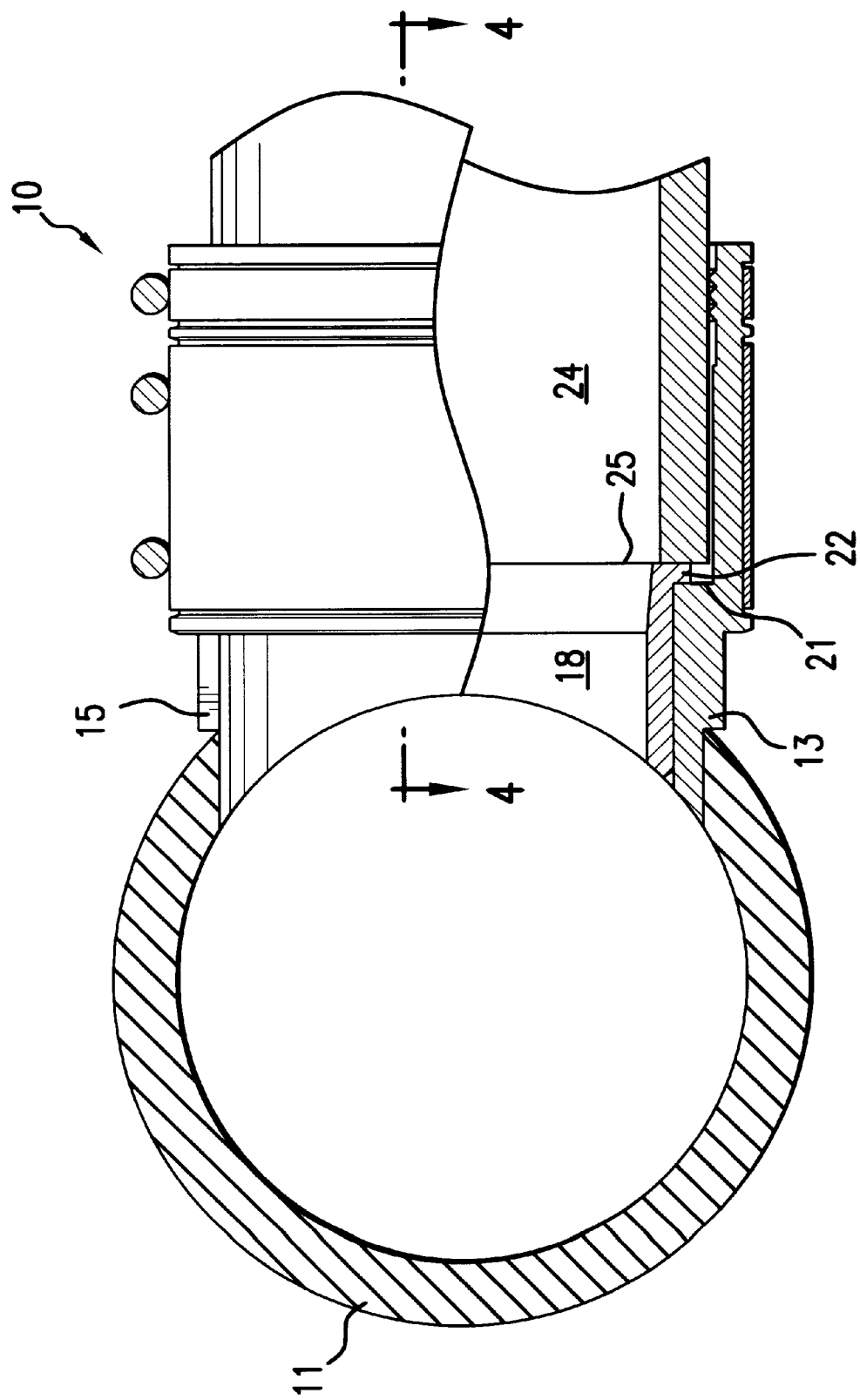
FIG. 4 is a partial cross-sectional view of the adapter fully inserted in the main line, the wedge fully inserted in the adapter, and the lateral pipe inserted in the adapter, with a compression band and a shear band placed, but not tightened, around the adapter, along the line 4—4 shown in FIG. 4, in accordance with an embodiment of the present invention.

Referring to FIGS. 3 and 4, when the wedge 18 is inserted into the adapter 13, the flange 22 of the wedge 18 rests against the ledge 21 along the inner surface of the adapter 13 to limit entry of the wedge 18 into the main line 11 and to position the wedge 18 such that the wedge 18 is substantially flush with the inner surface of the main line 11. In addition, a portion of the wedge 18 is urged against the lower cylindrical surface 33 of the adapter 13 such that a portion of the lower cylindrical surface 33 expands radially outward against the edge 14 of the hole 12 in the main line 11 and thus forms a seal with the main line 11. Specifically, the second cylindrical surface 34 of the wedge 18 is urged against the shoulder portion 17 and the expansion band portion 16 of the lower cylindrical surface portion 33 of the adapter 13 such that the shoulder 17 and the expansion band 16 expand radially outward and the expansion band 16 presses against the edge 14 of the hole 12 and thus forms a seal with the main line 11. Force is exerted only against the shoulder 17 and the expansion band 16 because the diameter of the second cylindrical surface 34 of the wedge 18 is slightly wider than the diameter of the shoulder 17 and the diameter of the expansion band 16. Force is not exerted against the cylindrical band 20 of the lower cylindrical surface 33 because the diameter of the first cylindrical surface 19 of the wedge 18 is slightly narrower than the diameter of the cylindrical band 20.

Figure 5:
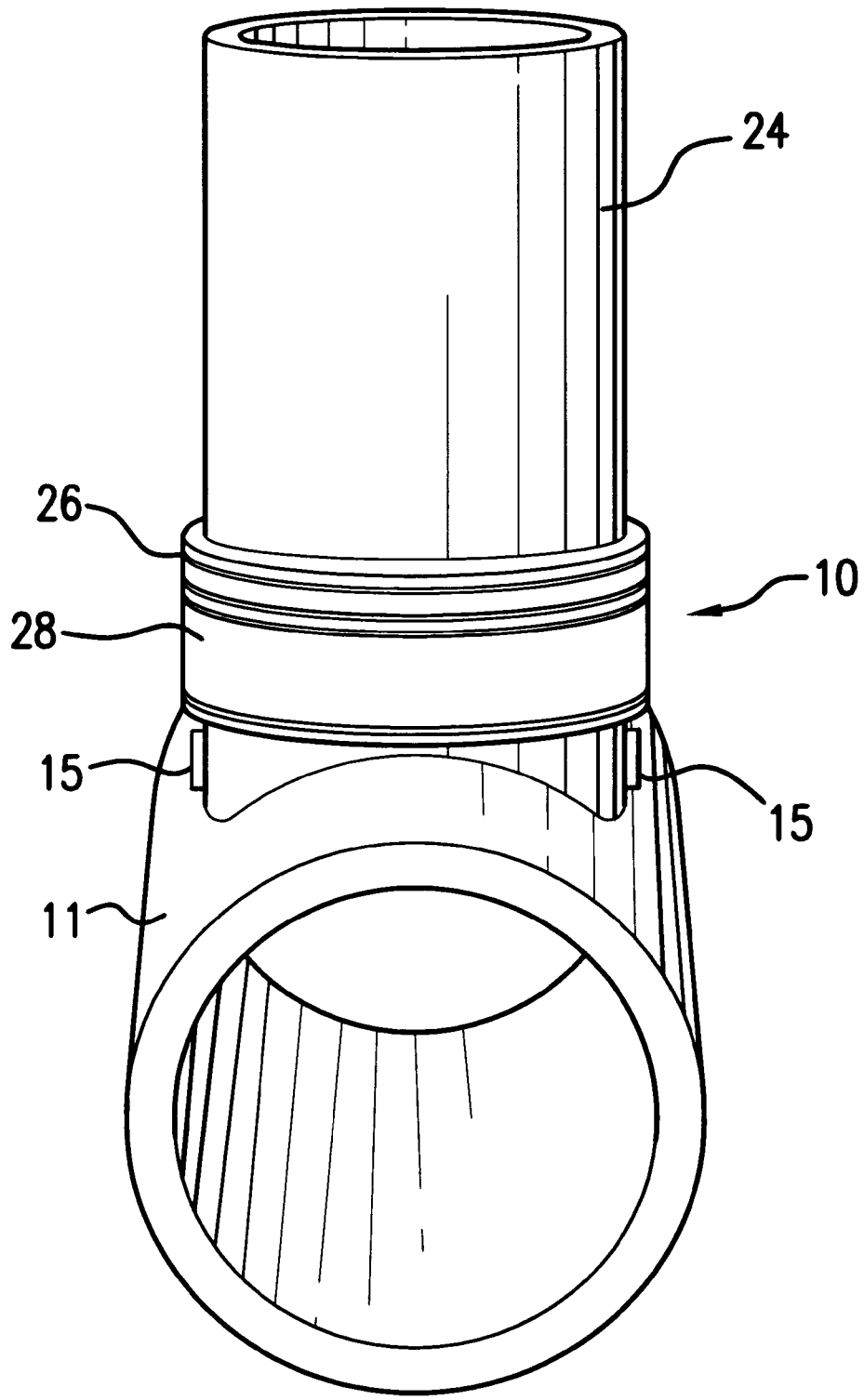
FIG. 5 is a perspective view of the the lateral pipe connected to the main line using the connector in accordance with an embodiment of the present invention.

Referring to FIGS. 4 and 5, the lateral pipe 24 is inserted into the other end of the adapter 13, and the front edge 25 of the lateral pipe 24 abuts the flange 22 of the wedge 18. In preferred embodiments, a compression band 26 is placed around the upper cylindrical surface 32 of the adapter 13. In one embodiment, the compression band 26 is made of stainless steel. However, in alternative embodiments, the compression band 26 may be made of other materials, such as other metals, plastic, ceramic, composites, or the like. The compression band 26 has at least one tightener 27 and is tightened to secure the lateral pipe 24 to the adapter 13. The compression band 26 also ensures that the wedge 18 remains in place.

In preferred embodiments, a shear band 28 is also placed around the upper cylindrical surface 32 of the adapter 13. In one embodiment, the shear band 28 is made of stainless steel. However, in alternative embodiments, the shear band 28 may be made of other materials, such as other metals, plastic, ceramic, composites, or the like. The shear band 28 is placed between grooves 31 along the outer surface of the adapter 13 to overlap the plane of the flange 22 of the wedge 18 and the front edge 25 of the lateral pipe 24 abutting the flange 22. The shear band 28 has at least one tightener 29 and is tightened to secure the lateral pipe 24 to the adapter 13. The shear band 28 also accepts shear forces on the lateral pipe 24 and/or the connector 10 resulting from any settling or shifting of earth surrounding the lateral pipe 24 and substantially maintains placement of the lateral pipe 24 in the adapter 13. The shear band 28 thus generally protects the connector 10 from damage, failure, and/or leakage. In alternative embodiments, the shear band 28 may be omitted. However, inclusion of the shear band 28 is preferred because the shear band 28 substantially resists shear forces of heavy earth loads and generally maintains placement of the lateral pipe 24, the connector 10, and the main line 11.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. An apparatus for connecting a first tubular conduit to be in flow communication with a second tubular conduit, the apparatus comprising:

an adapter defining an upper, generally cylindrical surface and a lower, generally cylindrical surface with an inner ledge therebetween, the adapter being configured for connection to: (i) the first tubular conduit such that the lower cylindrical surface of the adapter is substantially flush with an inner surface of the first tubular conduit, and (ii) the second tubular conduit such that there is flow communication therebetween;

a generally cylindrical wedge having an outwardly extending flange portion and a generally cylindrical depending portion, the wedge being configured for insertion into the adapter such that the flange portion abuts against the ledge of the adapter and the cylindrical portion is substantially flush with the inner surface of the first tubular conduit, and further wherein the cylindrical portion of the wedge is urged against the lower cylindrical surface of the adapter such that a portion of the lower cylindrical surface of the adapter expands radially outward to form a seal with the first tubular conduit; and a plurality of stops that adjust the position of the adapter to be relative to the first tubular conduit.

2. The apparatus of claim 1, wherein the apparatus further includes alignment marks disposed on both ends of the adapter and both ends of the wedge for aligning the adapter and the wedge when joined together.

3. The apparatus of claim 1, wherein the adapter further includes a band for securing the second tubular conduit thereto.

4. An apparatus for connecting a first tubular conduit in flow communication with a second tubular conduit, the apparatus comprising:

an adapter defining an upper, generally cylindrical surface and a lower, generally cylindrical surface with an inner ledge therebetween, wherein the diameter of the upper cylindrical surface is wider than the diameter of the lower cylindrical surface, and wherein the adapter is connected to the first and second tubular conduits such that there is flow connection therebetween; and a generally cylindrical wedge having an outwardly extending flange portion and a generally cylindrical depending portion, the wedge being configured for insertion into the adapter such that the flange portion abuts against the ledge of the adapter, and further wherein the cylindrical portion of the wedge is urged against the lower cylindrical surface of the adapter such that a portion of the lower cylindrical surface of the adapter expands radially outward to form a seal with the first tubular conduit and a plurality of stops that adjust the position of the adapter to the first tubular conduit.

5. The apparatus of claim 4, wherein the apparatus further includes a band for maintaining placement of the second tubular conduit therein.

6. In an apparatus connecting a first tubular conduit in flow communication with a second tubular conduit, in which an adapter is connected to the first and second tubular conduits such that there is flow communication therebetween, and in which a wedge is inserted into the adapter, the improvement in the apparatus comprising:

the adapter defining an upper, generally cylindrical surface and a lower, generally cylindrical surface with an inner ledge therebetween, wherein the diameter of the upper cylindrical surface is wider than the diameter of the lower cylindrical surface, the adapter being configured for connection to the first tubular conduit such that the lower cylindrical surface of the adapter is substantially flush with an inner surface of the first tubular conduit; and a generally cylindrical wedge having an outwardly extending flange portion and a generally cylindrical depending portion, the wedge being configured for insertion into the adapter such that the flange portion abuts against the ledge of the adapter and the cylindrical portion is substantially flush with the inner surface of the first tubular conduit, and wherein the second tubular conduit abuts against the flange portion of the wedge, and further wherein the cylindrical portion of the wedge is urged against the lower cylindrical surface of the adapter such that a portion of the lower cylindrical surface of the adapter expands radially outward to form a seal with the first tubular conduit and a plurality of stops that adjust the position of the adapter to the first tubular conduit.

* * * * *